United States Patent
Takagi et al.

(10) Patent No.: US 7,302,147 B2
(45) Date of Patent: Nov. 27, 2007

(54) THREE-DIMENSIONAL PHOTONIC CRYSTAL AND FUNCTIONAL DEVICE INCLUDING THE SAME

(75) Inventors: Akinari Takagi, Yokosuka (JP);
Kazuya Nobayashi, Kawasaki (JP);
Hikaru Hoshi, Yokohama (JP);
Kiyokatsu Ikemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/551,745

(22) Filed: Oct. 23, 2006

(65) Prior Publication Data
US 2007/0172190 A1   Jul. 26, 2007

(30) Foreign Application Priority Data
Oct. 26, 2005 (JP) ............... 2005-311260

(51) Int. Cl.
G02B 6/10 (2006.01)
G02B 6/032 (2006.01)

(52) U.S. Cl. ............. 385/129; 385/125; 385/131; 359/332

(58) Field of Classification Search .......... None
See application file for complete search history.

(56) References Cited

U.S. PATENT DOCUMENTS

| | | | |
|---|---|---|---|
| 5,335,240 A | | 8/1994 | Ho et al. |
| 5,406,573 A | * | 4/1995 | Ozbay et al. ......... 372/43.01 |
| 5,440,421 A | | 8/1995 | Fan et al. |
| 5,998,298 A | * | 12/1999 | Fleming et al. ......... 438/692 |
| 6,358,854 B1 | | 3/2002 | Fleming et al. |
| 6,597,851 B2 | | 7/2003 | Johnson et al. |
| 2003/0133683 A1 | * | 7/2003 | Forbes et al. ........... 385/132 |
| 2003/0223721 A1 | * | 12/2003 | Povinelli et al. ........ 385/129 |

FOREIGN PATENT DOCUMENTS

EP   1574884 A   9/2005

(Continued)

OTHER PUBLICATIONS

Roundy, David; et al., "Photonic crystal structure with square symmetry within each layer and a three-dimensional band gap", Applied Physics Letters, AIP, Melville, NY, US, vol. 82, No. 22, Jun. 2, 2003, pp. 3835-3837, XP012034241.

(Continued)

Primary Examiner—Tina M. Wong
(74) Attorney, Agent, or Firm—Canon USA, Inc., IP Division

(57) ABSTRACT

A three-dimensional photonic crystal has periodic-refractive-index structures including a first layer having a periodic structure based on a first rectangular lattice having a period of A along a first axis and a period of B along a second axis orthogonal to the first axis in the plane direction, a second layer having a periodic structure disposed at a position shifted by +3B/8 along the second axis with respect to the position of the first rectangular lattice, a third layer having a periodic structure disposed at a position shifted by A/2 along the first axis and B/2 along the second axis with respect to the position of the periodic structure in the first layer, and a fourth layer having a periodic structure disposed at the same position as the periodic structure in the second layer.

13 Claims, 14 Drawing Sheets

FOREIGN PATENT DOCUMENTS

| JP | 2001-074954 A | 3/2001 |
|---|---|---|
| WO | 03-087904 A1 | 10/2003 |
| WO | 2005-006039 A | 1/2005 |

OTHER PUBLICATIONS

Johnson, Steven G.; et al., "Three-dimensionally periodic dielectric layered structure with omnidirectional photonic band gap", Applied Physics Letters, AIP, Melville, NY, US, vol. 77, No. 22, Nov. 27, 2000, pp. 3490-3492, XP01202673.

Maldovan, Martin; et al., "Exploring for 3D photonic bandgap structures in the 11 f.c.c. space groups", Nature Materials, Nature Publishing Group, London, GB, vol. A2, No. 10, Oct. 2003, pp. 664-667, XP00807548.

Maldovan, Martin; et al., "Diamond-Structured Photonic Crystals", Nature Materials, Nature Publishing Group, London, GB, vol. 3, Sep. 2004, pp. 593-600, XP008075485.

Eli Yablonovitch, "Inhibited Spontaneous Emission in Solid-State Physics and Electronics", Physical Review Letters, vol. 58, pp. 2059-2062, 1987.

* cited by examiner

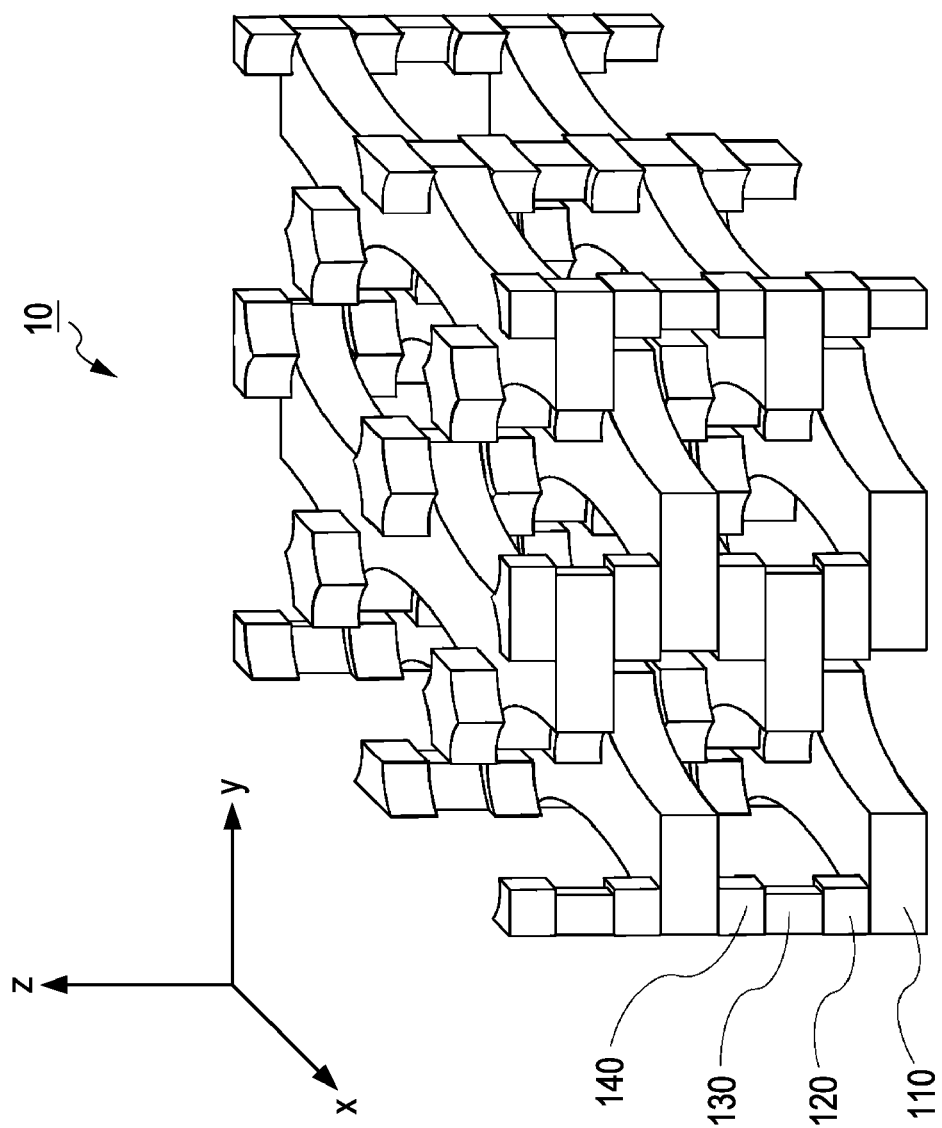

--Prior Art--

--Prior Art--

--Prior Art--

THREE-DIMENSIONAL PHOTONIC CRYSTAL AND FUNCTIONAL DEVICE INCLUDING THE SAME

BACKGROUND OF THE INVENTION

1. Field of the Invention

The present invention relates to a three-dimensional photonic crystal having a three-dimensional periodic-refractive-index structure and to functional devices, such as a waveguide, a resonator, a filter, a laser, and a polarizing device, including the same.

2. Description of the Related Art

The concept of controlling transmission and reflection characteristics of electromagnetic waves with structures having a size equal to or smaller than the wavelength of the waves has been proposed by Yablonovitch (Physical Review Letters, Vol. 58, p. 2059, 1987). According to this document, transmission and reflection characteristics of electromagnetic waves can be controlled by periodic structures having a period equal to or smaller than the wavelength.

Such a structure is known as a photonic crystal. It has been suggested that photonic crystals can be used to realize a reflective mirror having a reflectance of 100% in a certain wavelength range.

Thus, a certain wavelength range in which a reflectance of 100% can be realized is referred to as a photonic bandgap, by analogy with the energy gap of semiconductors.

In addition, when the structures having a size equal to or smaller than the wavelength have a three-dimensional fine periodic structure, the photonic bandgap can be realized for electromagnetic waves such as light incident from all directions. Hereinafter, this is referred to as a complete photonic bandgap.

When the complete photonic bandgap is realized, various applications, such as a suppression of spontaneous emission in a light-emitting device, can be performed to realize new functional devices. In order to realize a functional device that operates over a wider frequency range, a structure having a wider complete photonic bandgap has been desired.

Some structures exhibiting such a photonic bandgap have been proposed (U.S. Pat. Nos. 5,335,240, 5,440,421, and 6,597,851).

FIG. 18A shows a woodpile structure proposed in U.S. Pat. No. 5,335,240. In this structure, a plurality of columnar structures disposed in parallel are stacked, the alignment of each layer rotated by 90 degrees with respect to that of adjacent layers.

FIG. 18B is a schematic view of a structure exhibiting a photonic bandgap disclosed in U.S. Pat. No. 5,440,421. In this structure, a plurality of holes have been made in a direction perpendicular to a plurality of columnar structures that are disposed in parallel so that parts of the columnar structures overlap in the stacking direction.

FIG. 18C is a schematic view of a structure exhibiting a photonic bandgap disclosed in U.S. Pat. No. 6,597,851. In this structure, layers having holes provided in the form of a triangular lattice and columnar structures provided in the form of a triangular lattice are stacked with a shift of ⅓ of the fundamental period between adjacent layers.

In the woodpile structure disclosed in U.S. Pat. No. 5,335,240, since four layers constitute one period, the structure is simple and is easily produced. However, the structure has a strong anisotropy, resulting in a strong directional dependence of the photonic bandgap.

The structure disclosed in U.S. Pat. No. 5,440,421 also has a complete photonic bandgap. However, a plurality of very deep holes must be formed, and it is very difficult to produce the structure.

The structure disclosed in U.S. Pat. No. 6,597,851 has an anisotropy smaller than that of the woodpile structure and has a relatively large photonic bandgap. However, since six layers constitute one period, the fabrication process is complex, for example, high accuracy is necessary for the alignment of layers. Thus, it is difficult to produce the structure.

SUMMARY OF THE INVENTION

The present invention provides a three-dimensional photonic crystal that exhibits a satisfactory photonic bandgap over a wide frequency range and that can be easily produced, and a functional device including the same.

According to a three-dimensional photonic crystal of the present invention, a three-dimensional photonic crystal in which a plurality of layers including a periodic-refractive-index structure are periodically stacked includes a first layer having a periodic structure in which holes filled with a second medium are provided at lattice points of a first rectangular lattice having a period of A along a first axis in the in-plane direction of the layers and a period of B along a second axis orthogonal to the first axis in the in-plane direction of the layers and at lattice points of a second rectangular lattice disposed at a position shifted by A/2 along the first axis and by B/4 along the second axis with respect to the position of the first rectangular lattice, and areas other than the holes are filled with a first medium; a second layer having a periodic structure in which columnar structures that are composed of the first medium and that have a longitudinal axis in the stacking direction are provided at lattice points of a face-centered rectangular lattice that is disposed at a position shifted by +3B/8 along the second axis with respect to the position of the first rectangular lattice and that has a period of A along the first axis and a period of B along the second axis, and the area other than the columnar structures is filled with the second medium; a third layer having a periodic structure the same as the periodic structure included in the first layer and disposed at a position shifted in the in-plane directions of the layer by A/2 along the first axis and by B/2 along the second axis with respect to the position of the periodic structure included in the first layer; and a fourth layer having a periodic structure the same as the periodic structure included in the second layer and disposed at the same position as the periodic structure included in the second layer in the in-plane directions of the layer. In the three-dimensional photonic crystal, the first layer, the second layer, the third layer, and the fourth layer are periodically stacked in that order. In the three-dimensional photonic crystal, when the refractive index of the first medium is represented by N1, the refractive index of the second medium is represented by N2, and the effective refractive index in the first layer and the third layer is represented by Ne1, the following relationship is satisfied:

$$1.25 \times N2 \leq Ne1 \leq 0.73 \times N1$$

Further features of the present invention will become apparent from the following description of exemplary embodiments with reference to the attached drawings.

BRIEF DESCRIPTION OF THE DRAWINGS

FIG. 1 is a schematic view of the relevant part of a three-dimensional photonic crystal according to a first embodiment of the present invention.

DESCRIPTION OF THE EMBODIMENTS

First Embodiment

FIG. 1 is a schematic view of the relevant part of a three-dimensional photonic crystal according to a first embodiment of the present invention. In FIG. 1, the direction in which layers 110 to 140 constituting a three-dimensional photonic crystal 10 are stacked is defined as the z-axis, a direction that is perpendicular to the z-axis and that is an in-plane direction of the layers is defined as the x-axis, and a direction that is orthogonal to the x-axis in the planes of the layers is defined as the y-axis. In the three-dimensional photonic crystal 10, the four layers 110 to 140 each having a periodic-refractive-index structure therein form a fundamental period in the stacking direction. A plurality of the fundamental periods are stacked, thereby forming the three-dimensional photonic crystal 10.

FIGS. 2A to 2E are schematic views of each layer of the three-dimensional photonic crystal of the first embodiment of the present invention. Among these, FIGS. 2A to 2D are schematic views of a part of the x-y cross-section of the layers 110 to 140.

Figure 2A:
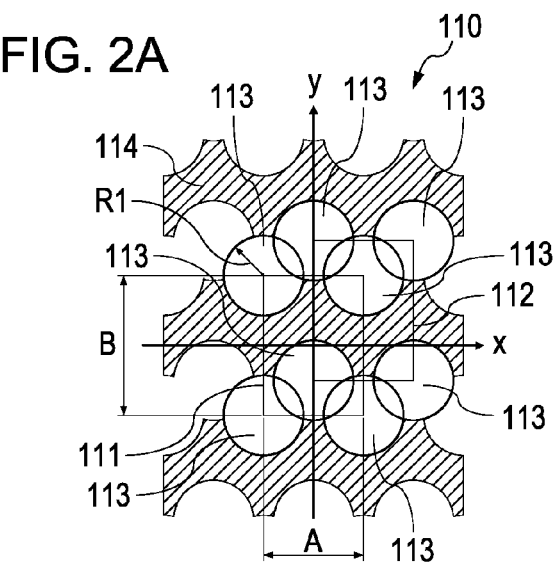
FIGS. 2A to 2E are schematic views of each layer of the three-dimensional photonic crystal according to the first embodiment of the present invention.

FIG. 2A is an x-y cross-sectional view of the first layer 110. In FIG. 2A, a rectangular lattice 111 has a period of A in the x-axis direction and a period of B in the y-axis direction. A rectangular lattice 112 has the same shape as that of the rectangular lattice 111 and is disposed at a position shifted by A/2 in the x-axis direction and by B/4 in the y-axis direction with respect to the position of the rectangular lattice 111. The first layer 110 has a periodic-refractive-index structure defined by the two rectangular lattices 111 and 112. More specifically, a round hole 113 having a radius of R1 and filled with a second medium (having a low refractive index N2) is disposed on each lattice point of the rectangular lattice 111 and the rectangular lattice 112. Areas 114 other than the round holes 113 comprise a first medium (having a high refractive index N1).

Figure 2B:
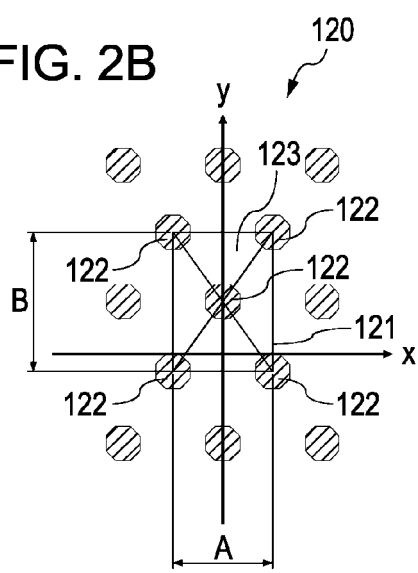

FIG. 2B is an x-y cross-sectional view of the second layer 120. The second layer 120 shown in FIG. 2B has a periodic-refractive-index structure defined by a face-centered rectangular lattice 121 having a period of A in the x-axis direction and a period of B in the y-axis direction. The face-centered rectangular lattice 121 has the same shape as that of the rectangular lattice 111 in the first layer 110 and is disposed at a position shifted by +3B/8 in the y-axis direction with respect to the position of the rectangular lattice 111. A columnar structure 122 composed of the first medium and having a longitudinal axis in the stacking direction is disposed on each lattice point of the face-centered rectangular lattice 121. An area 123 other than the columnar structures 122 is filled with the second medium. Each of the columnar structures 122 in the second layer 120 is disposed at a position in which the distance from the adjacent round hole in the first layer 110 is equal to the distance from the adjacent round hole in the third layer 130.

Figure 2C:
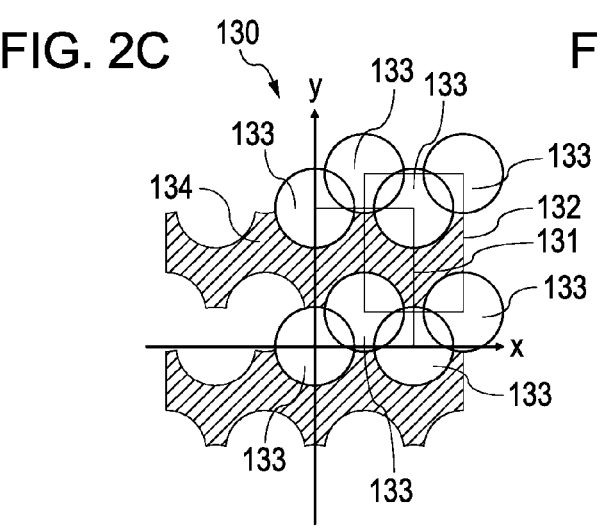

FIG. 2C is an x-y cross-sectional view of the third layer 130. In FIG. 2C, a rectangular lattice 131 and a rectangular lattice 132 are disposed at positions shifted by A/2 in the x-axis direction and by B/2 in the y-axis direction with respect to the positions of the rectangular lattice 111 and the rectangular lattice 112 in the first layer 110, respectively. The third layer 130 has a periodic-refractive-index structure defined by the rectangular lattice 131 and the rectangular lattice 132. As in the first layer 110, a round hole 133 having a radius of R1 and filled with the second medium is disposed on each lattice point of the rectangular lattice 131 and the rectangular lattices 132. Areas 134 other than the round holes 133 comprise the first medium.

Figure 2D:
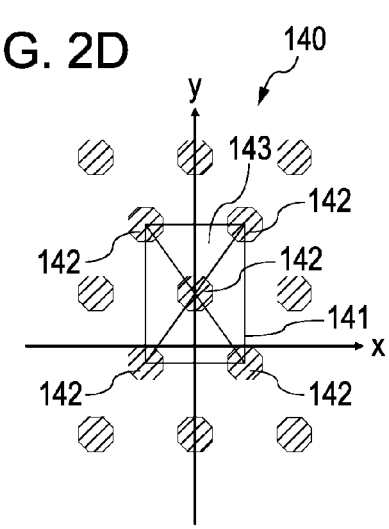

FIG. 2D is an x-y cross-sectional view of the fourth layer 140. The fourth layer 140 shown in FIG. 2D has a periodic-refractive-index structure defined by a face-centered rectangular lattice 141 that is disposed at the same position in the x and y directions as the face-centered rectangular lattice 121 in the second layer 120. A columnar structure 142 composed of the first medium is disposed on each lattice point of the face-centered rectangular lattice 141. An area 143 other than the columnar structures 142 is filled with the second medium.

Figure 2E:
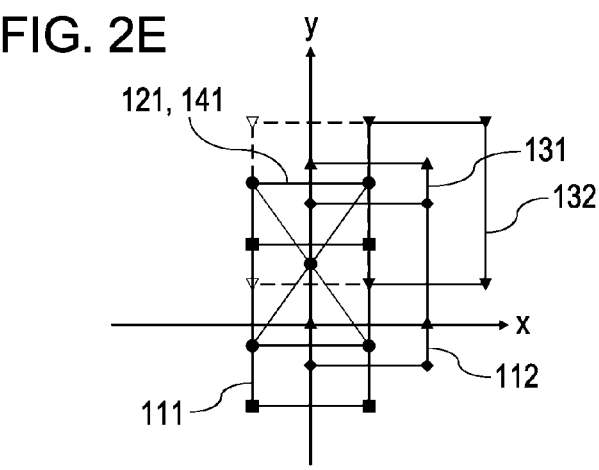

FIG. 2E is a view showing the relationship between lattice points in the individual layers. The central coordinates of the rectangular lattice 111 are defined as the origin of the x-axis and the y-axis, and the x coordinate and the y coordinate of the central point of each fundamental lattice are represented by (x, y). In this case, the coordinates of the central point of the rectangular lattice 111 are (0, 0), and those of the rectangular lattice 112 are (A/2, B/4). The coordinates of the central point of the face-centered rectangular lattice 121 and those of the face-centered rectangular lattice 141 are (0, 3B/8), those of the rectangular lattice 131 are (A/2, B/2), and those of the rectangular lattice 132 are (A, 3B/4) or (0, 3B/4).

The refractive index N1 of the first medium, the refractive index N2 of the second medium, the radius R1 of the round hole 113 and the round hole 113, the shape of the x-y cross-section of the columnar structure 122 and the columnar structure 142, the lengths of the period A and the period B, and the thicknesses of the individual layers are optimized. That is, these values are determined so that a photonic bandgap is formed in a desired wavelength range.

The shape of the columnar structure 122 of the second layer 120 and the columnar structure 142 of the fourth layer 140 can be defined by the shape surrounded by holes (round hole, polygonal hole, or the like) filled with the second medium.

Figure 3:
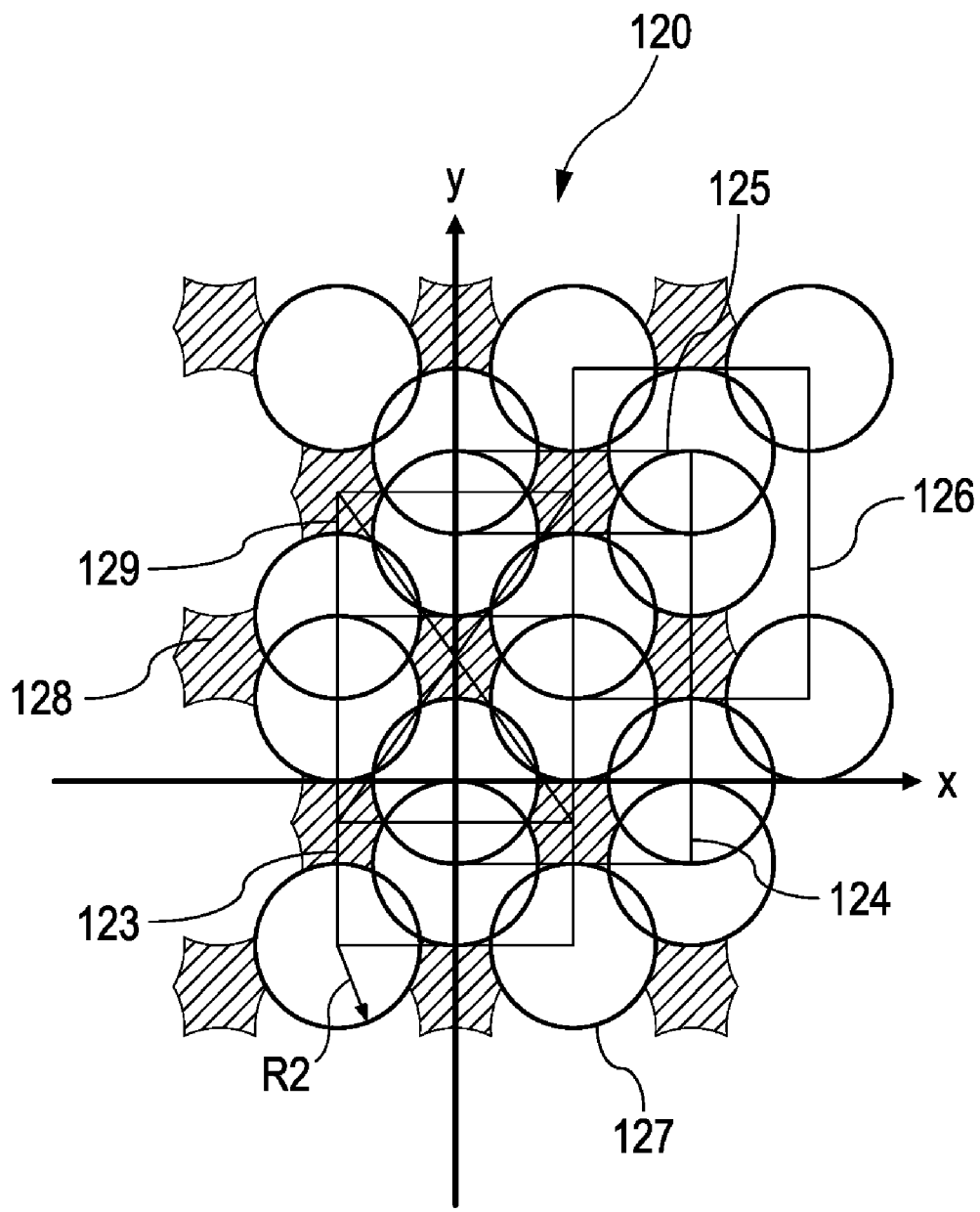
FIG. 3 is a view illustrating a second layer of the three-dimensional photonic crystal according to the first embodiment of the present invention.

In FIG. 3, round holes 127 are filled with the second medium (having a refractive index of N2) and have a radius of R2. The round holes 127 are disposed on the lattice points of rectangular lattices 123, 124, 125, and 126. Columnar structures 128 of the second layer 120 are disposed at positions other than those of the plurality of round holes 127 and composed of the first medium (having a refractive index of N1). As a result, the columnar structures 128 are disposed on lattice points of a face-centered rectangular lattice 129 having a period A in the x-axis direction and a period of B in the y-axis direction.

The rectangular lattices 123, 124, 125, and 126 are disposed at the same positions as those of the rectangular lattices 111, 112, 131, and 132 of the first layer 110 or the third layer 130, respectively, in the x and y directions.

The shape of the holes 127 may be a circle, an ellipse, or a polygon. The area and the shape of the round holes 127 of the second layer 120 and the fourth layer 140 may be the same as those of the round holes 113 and 133 of the first layer 110 and the third layer 130, respectively.

Table 1 shows the structural parameters of the three-dimensional photonic crystal of the first embodiment. The refractive index of the first medium is represented by N1, the refractive index of the second medium is represented by N2, the thickness of the first layer and the third layer is represented by H1, the thickness of the second layer and the fourth layer is represented by H2, and the period in the stacking direction, which is the sum of the thicknesses from the first layer to the fourth layer, is represented by C.

Figure 4:
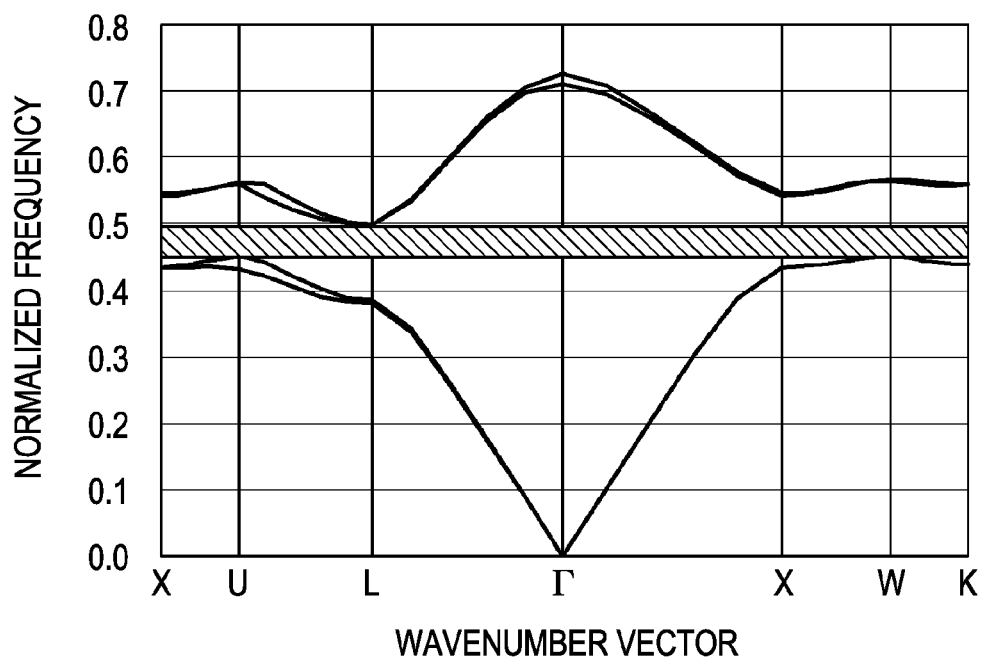
FIG. 4 is a schematic diagram of a photonic band structure of the three-dimensional photonic crystal according to the first embodiment of the present invention.

FIG. 4 shows a photonic band structure of the three-dimensional photonic crystal shown in Table 1 calculated by the plane-wave expansion method.

In FIG. 4, the abscissa represents a wavenumber vector, that is, the incident direction of electromagnetic waves incident on the photonic crystal. For example, point K represents a wavenumber vector parallel to the z-axis, and point X represents a wavenumber vector having a slope of 45° with respect to the z-axis (or the x-axis) in the x-z plane. The ordinate represents a frequency normalized by a lattice period p (normalized frequency).

In the area ranging from a normalized frequency of 0.454 to a normalized frequency of 0.497, which is shown by the hatching in FIG. 4, light cannot be present regardless of the incident direction of the light, thus forming a complete photonic bandgap. When the center (normalized) frequency of the complete photonic bandgap is represented by $\omega_0$, and the (normalized) frequency bandwidth of the complete photonic bandgap is represented by $\Delta\omega$, the complete photonic bandgap ratio $\Delta\omega/\omega_0$ in this structure is 0.092.

This value is about 1.2 times the complete photonic bandgap ratio of the woodpile structure composed of media having the same refractive indices (the refractive index of the medium constituting the rectangular columns being 2.4 and the refractive index of the medium constituting areas other than the rectangular columns being 1.0).

Here, the value of p (period A) is determined so that the complete photonic bandgap is exhibited over a desired wavelength range (frequency range).

For example, when the period p is 250 nm, the complete photonic bandgap is exhibited over the wavelength range of 503 to 550 nm. When the period p is 750 nm, the complete photonic bandgap is exhibited over the wavelength range of 1,509 to 1,652 nm.

TABLE 1

| Refractive index N1 | 2.4 |
| Refractive index N2 | 1.0 |
| Period A | p |
| Period B | $\sqrt{2} \times p$ |
| Period C | p |
| Radius R1 of round hole | $0.435 \times p$ |
| Radius R2 of round hole | $0.34 \times p$ |
| Layer thickness H1 | $0.28 \times p$ |
| Layer thickness H2 | $0.22 \times p$ |

Here, the effective refractive index in each layer is represented by Ne. The volume ratio of the areas formed by the first medium (having a refractive index of N1) in a layer is represented by f1, and the volume ratio of the areas formed by the second medium (having a refractive index of N2) in the layer is represented by f2. In this case, the effective refractive index Ne in the layer is represented by numerical expression (1) using the refractive index N1 of the first medium and the refractive index N2 of the second medium.

The refractive indices N1 and N2 of the media are refractive indices of the media at the center wavelength of the photonic bandgap.

$$Ne = f1 \times N1 + f2 \times N2 \quad (1)$$

When the effective refractive index in the first layer 110 is represented by Ne1, the volume ratio f1 and the volume ratio f2 are changed by changing the value of radius R1 of the round holes constituting the periodic-refractive-index structure. As a result, the effective refractive index Ne1 can be changed.

Since the shape of the periodic-refractive-index structure formed inside the third layer 130 is the same as that of the first layer 110, the effective refractive index Ne3 in the third layer 130 is the same as the effective refractive index in the first layer 110.

Figure 5:
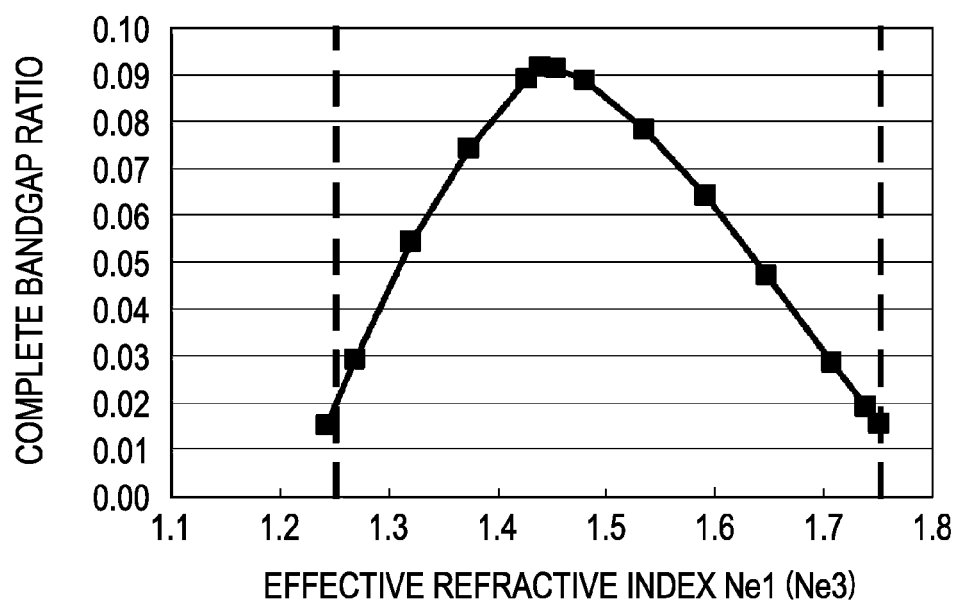
FIG. 5 is a graph showing the relationship between the effective refractive index Ne1 and the complete photonic bandgap ratio of the three-dimensional photonic crystal according to the first embodiment of the present invention.

FIG. 5 shows the change in the complete photonic bandgap ratio in the case where the radius R1 of the round hole in the structure shown in Table 1 is changed to change the effective refractive indices Ne1 and Ne3 in the first layer 110 and the third layer 130, respectively.

In FIG. 5, the abscissa represents the effective refractive index Ne1 (Ne3), and the ordinate represents the complete photonic bandgap ratio.

As shown in FIG. 5, in order to exhibit a complete photonic bandgap, the effective refractive index Ne1 (Ne3) must be in the range satisfying numerical expression (2).

The lower limit and the upper limit of numerical expression (2) are shown by the broken lines in FIG. 5.

When the refractive indices N1 and N2 are the values shown in Table 1, the lower limit is 1.25(1×1.25) and the upper limit is 1.752(2.4×0.73). The effective refractive index Ne1 in the first layer 110 of the structure shown in Table 1 is 1.44, which satisfies numerical expression (2).

$$1.25 \times N2 \leq Ne1 \leq 0.73 \times N1 \quad (2)$$

An explanation will be made of the reason why the effective refractive index Ne1 in the first layer 110 must satisfy the numerical range of numerical expression (2).

The principle of exhibiting a photonic bandgap can be described by analogy with the principle of exhibiting an energy bandgap of electrons in a crystal. Specifically, the principle of exhibiting the photonic bandgap is described in comparison with a phenomenon in which the wave motion of electrons in the crystal becomes a standing wave state having two different energies due to the translational symmetry of a periodic potential energy, resulting in a generation of an energy gap. That is, the wave motion of electromagnetic waves in a photonic crystal becomes a standing wave state having two different energies (frequencies) due to a periodic dielectric constant distribution instead of the periodic potential energy. As a result, a photonic bandgap is exhibited.

The modal refractive index (mode dielectric constant) due to the energy distribution of the standing waves corresponds to the effective mass in the electron system. When the magnetic permeability is 1, the relationship between the wavenumber k and the angular frequency ω can be represented using numerical expression (3):

$$\omega = v \times k/Nm = v \times k/\sqrt{Dm} \quad (3)$$

where v represents the velocity of light in vacuum, Nm represents the modal refractive index, and Dm represents the modal dielectric constant.

Regarding standing waves at both ends of the photonic bandgap, in the standing wave at the band end of the low frequency side, the energy is concentrated at the side of the medium having a high refractive index. Therefore, the modal refractive index increases.

Consequently, the frequency corresponding to a certain wavenumber k decreases. In contrast, in the standing wave at the band end of the high frequency side, the energy is concentrated at the side of the medium having a low refractive index. Therefore, the modal refractive index decreases. Consequently, the frequency corresponding to a certain wavenumber k increases.

Thus, two states in which the frequency is different are generated for the same wavenumber k, and light having a frequency therebetween cannot be present, thus producing the photonic bandgap. Accordingly, in order to produce the photonic bandgap, for the standing waves at both band ends, there must be a satisfactory difference between the modal refractive indices.

In the photonic crystal structure of the first embodiment, when the effective refractive index Ne1 is below the lower limit represented in numerical expression (2), the volume ratio of the medium having a high refractive index is excessively low. As a result, the concentration of energy to the side of the medium having the high refractive index at the band end of the low frequency side cannot be maintained. Consequently, the energy leaks to the side of the medium having the low refractive index, resulting in a decrease in the modal refractive index. Accordingly, a difference in the modal refractive index that is effective for producing the photonic bandgap cannot be obtained with the band end of the high frequency side.

On the other hand, when the effective refractive index Ne1 exceeds the upper limit represented in numerical expression (2), the volume ratio of the medium having a low refractive index is excessively low. As a result, the concentration of energy to the side of the medium having the low refractive index at the band end of the high frequency side cannot be maintained. Consequently, the energy leaks to the side of the medium having the high refractive index, resulting in an increase in the modal refractive index. Accordingly, a difference in the modal refractive index that is effective for producing the photonic bandgap cannot be obtained with the band end of the low frequency side.

In particular, the value of the effective refractive index Ne1 significantly affects electromagnetic waves having a polarizing direction in the y-axis direction in which the medium having a high refractive index (refractive index N1) in the first layer 110 and the third layer 130 forms a connection and electromagnetic waves having a polarizing direction in the y-z diagonal direction or the x-z diagonal direction.

In order to obtain a wider complete photonic bandgap width, the effective refractive index Ne1 in the first layer 110 satisfies $1.3 \times N2 \leq Ne1 \leq 0.7 \times N1$, and further satisfies $1.4 \times N2 \leq Ne1 \leq 0.65 \times N1$.

Among known three-dimensional photonic crystal structures, the woodpile structure, in which the number of layers constituting one period is small, has structural isotropy in the plane perpendicular to the stacking direction. However, the woodpile structure has strong anisotropy in the plane including the stacking direction. Therefore, the directional dependence of the photonic bandgap due to the anisotropy of the structure is strong, and thus the frequency range of the complete photonic bandgap is narrow.

In contrast, in the three-dimensional photonic crystal of this embodiment, since the area in which the medium having the high refractive index is connected and the area in which the medium having the low refractive index is connected are increased with respect to the y-z diagonal direction and the x-z diagonal direction, the structure has a high symmetry. Accordingly, isotropy of the photonic bandgap due to the symmetry of the structure is obtained. Thus, a wide frequency range of the complete photonic bandgap can be obtained.

Furthermore, the holes disposed on each lattice point in the layers are round holes, elliptical holes, or polygonal holes. Thereby, projected parts formed by the overlapping parts of the holes can further improve the isotropy of the structure in oblique directions to obtain a wide complete photonic bandgap.

As described above, in this embodiment, layers having a periodic-refractive-index structure are stacked to form a photonic crystal. In this case, the periodic-refractive-index structure in the first layer 110 is determined so that the effective refractive index Ne1 in the first layer 110 is within the predetermined range. Thereby, the photonic bandgap can be exhibited over a wide frequency range.

Furthermore, in the photonic crystal of this embodiment, the number of layers constituting one period is small. Therefore, a three-dimensional photonic crystal that is easily produced can be realized.

In the first embodiment, round holes are used as the holes disposed on the lattice points of the rectangular lattice in the first layer 110. Alternatively, the cross-sectional shape in the plane of the layer may be an ellipse or a polygon.

In the first embodiment, as shown in FIG. 3, the structure defined by the round holes 127 and the columnar structures 128, which are areas other than the round holes 127, is used as the periodic-refractive-index structure in the second layer 120 and the fourth layer 140. Alternatively, different structures may be used.

Alternatively, adjacent columnar structures may be connected by areas composed of the first medium.

Figure 6:
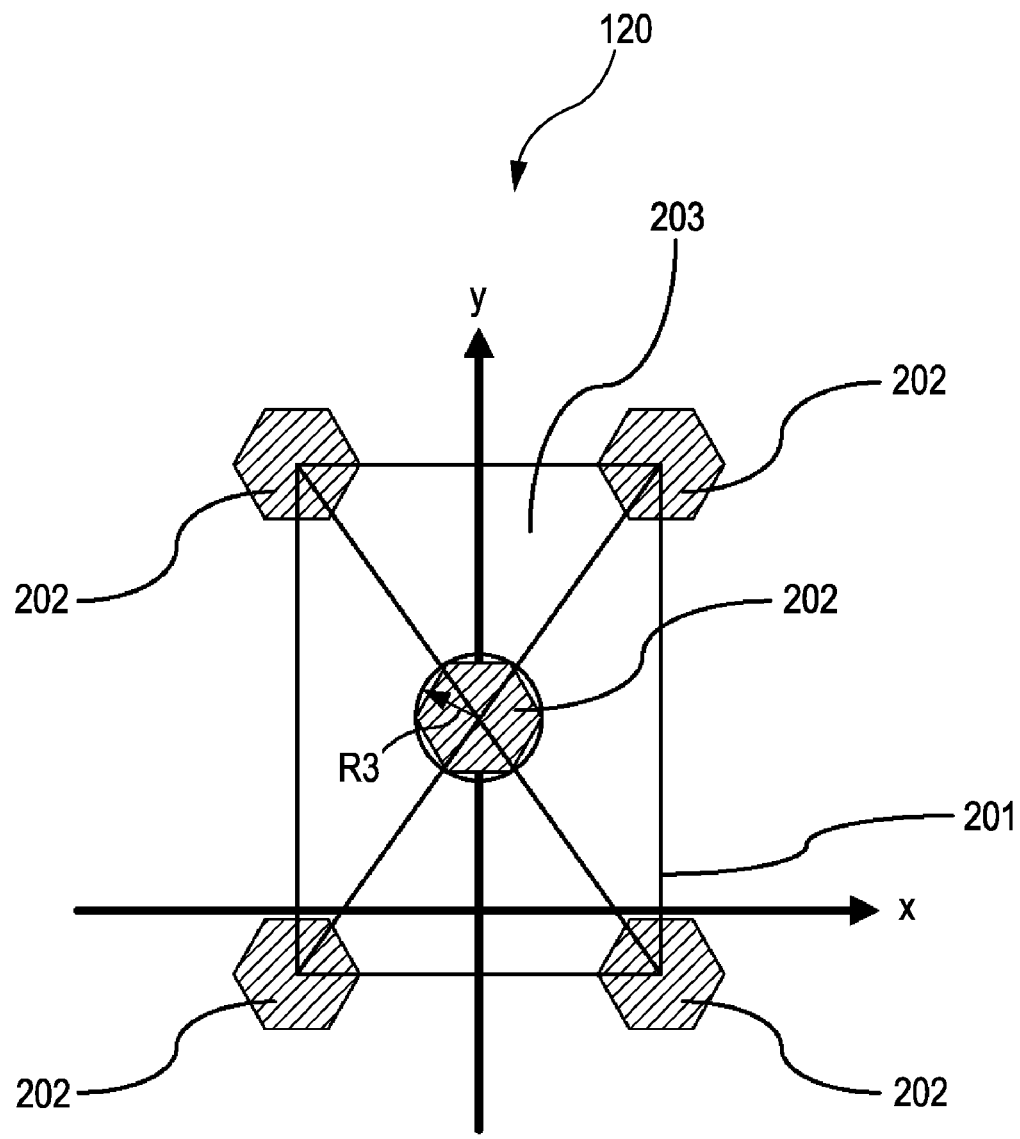
FIG. 6 is a view illustrating another example of the second layer of the three-dimensional photonic crystal according to the first embodiment of the present invention.

As shown in FIG. 6, the structure may have hexagonal columnar structures 202 that are composed of the first medium and that are disposed on lattice points of a face-centered rectangular lattice 201. In this structure, an area 203 other than the hexagonal columnar structures 202 may be filled with the second medium.

The radius of the circumscribed circle of the hexagon of the x-y cross-section of the hexagonal columnar structure 202 is represented by R3, and the detailed structural parameters are shown in Table 2. The structure shown in Table 2 is analyzed by the plane-wave expansion method. According to the result, the complete photonic bandgap ratio is 0.082. In this case, the effective refractive index Ne1 in the first layer 110 is 1.454, which satisfies numerical expression (2).

As described above, polygonal columns, circular cylinders, or elliptic cylinders may be used as the periodic-refractive-index structure in the second layer 120 and the periodic-refractive-index structure in the fourth layer 140. In this case, the effective refractive index Ne1 in the first layer 110 satisfies numerical expression (2), thereby obtaining the complete photonic bandgap over a wide frequency range.

Furthermore, in the photonic crystal of this embodiment, the number of layers constituting one period is small. Therefore, a three-dimensional photonic crystal that is easily produced can be realized.

TABLE 2

| | |
|---|---|
| Refractive index N1 | 2.4 |
| Refractive index N2 | 1.0 |
| Period A | p |
| Period B | $\sqrt{2} \times p$ |
| Period C | p |
| Radius R1 of round hole | $0.43 \times p$ |
| Radius R3 of circumscribed circle | $0.26 \times p$ |
| Layer thickness H1 | $0.31 \times p$ |
| Layer thickness H2 | $0.19 \times p$ |

As described Table 2, the three-dimensional photonic crystal of the first embodiment has the following structure.

The rectangular lattice 111 is a rectangular lattice having a period of A along a first axis (x-axis) in the in-plane direction of the layer and a period of B along a second axis (y-axis) orthogonal to the first axis in the in-plane direction of the layer. The rectangular lattice 112 is a rectangular lattice disposed at a position shifted by A/2 along the first axis and by B/4 along the second axis with respect to the position of the rectangular lattice 111.

The first layer 110 has a periodic structure in which holes 113 filled with the second medium (having a refractive index of N2) are provided at lattice points of the rectangular lattice 111 and lattice points of the rectangular lattice 112, and areas other than the holes 113 comprise the first medium (having a first refractive index of N1).

The face-centered rectangular lattice 121 is a face-centered rectangular lattice having a period of A along the first axis and a period of B along the second axis.

The second layer 120 has a periodic structure in which columnar structures 122 that are composed of the first medium and that have a longitudinal axis in the stacking direction are provided at lattice points of the face-centered rectangular lattice 121, and the area other than the columnar structures 122 is filled with the second medium.

The third layer 130 has a periodic structure the same as the periodic structure included in the first layer 110 and disposed at a position shifted in the in-plane directions of the layer by A/2 along the first axis and by B/2 along the second axis with respect to the position of the periodic structure included in the first layer 110.

The fourth layer 140 has a periodic structure the same as the periodic structure included in the second layer 120 and disposed at the same position as the periodic structure included in the second layer 120 in the in-plane directions of the layer.

The three-dimensional photonic crystal includes a plurality of sets of layers, each set including a first layer 110, a second layer 120, a third layer 130, and a fourth layer 140 stacked in that order.

In this embodiment, four layers constitute one period. However, it is sufficient that the plurality of layers constitute at least one period. The number of layers is not necessarily 4×n (wherein n is a positive integer).

In addition, the effective refractive index Ne1 is set so as to satisfy numerical expression (2).

Second Embodiment

A three-dimensional photonic crystal according to a second embodiment of the present invention will now be described.

In the second embodiment, the refractive index N1 of the first medium of the photonic crystal shown in FIGS. 1 to 3 is different from that in the first embodiment shown in Table 1. Table 3 shows the detailed structural parameters of the three-dimensional photonic crystal of the second embodiment.

Figure 7:
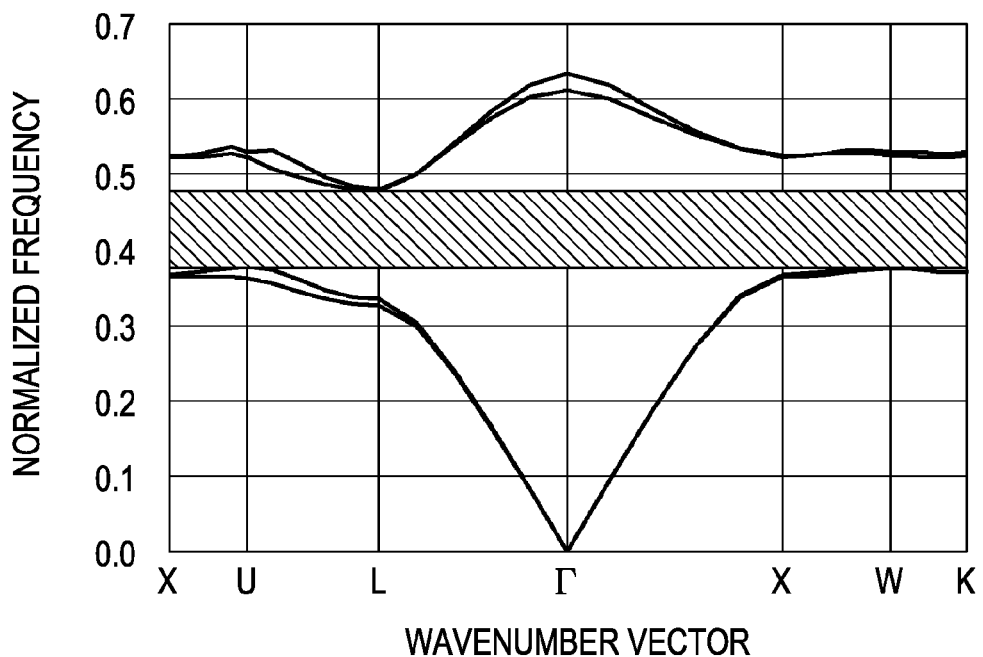
FIG. 7 is a schematic diagram of a photonic band structure of a three-dimensional photonic crystal according to a second embodiment of the present invention.

FIG. 7 shows a photonic band structure of the three-dimensional photonic crystal shown in Table 3 calculated by the plane-wave expansion method. The complete photonic bandgap ratio $\Delta\omega/\omega_0$ in this structure is 0.230. In this case, the effective refractive index Ne1 in the first layer is 1.57, which satisfies numerical expression (2).

TABLE 3

| | |
|---|---|
| Refractive index N1 | 3.3 |
| Refractive index N2 | 1.0 |
| Period A | p |
| Period B | $\sqrt{2} \times p$ |
| Period C | p |
| Radius R1 of round hole | $0.47 \times p$ |
| Radius R2 of round hole | $0.36 \times p$ |
| Layer thickness H1 | $0.25 \times p$ |
| Layer thickness H2 | $0.25 \times p$ |

Figure 8:
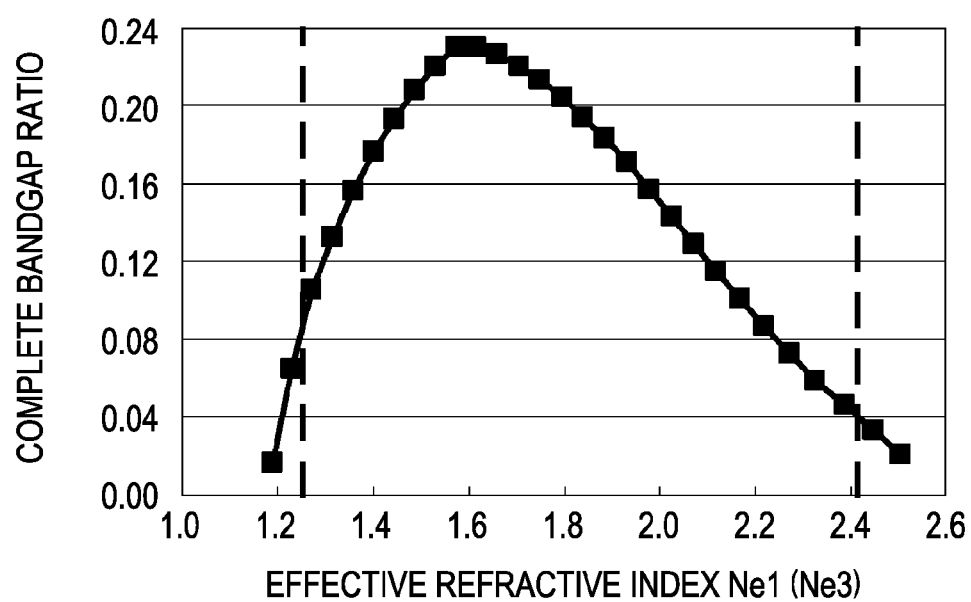
FIG. 8 is a graph showing the relationship between the effective refractive index Ne1 and the complete photonic bandgap ratio of the three-dimensional photonic crystal according to the second embodiment of the present invention.

FIG. 8 shows the change in the complete photonic bandgap ratio in the case where the radius R1 of the round hole in the structure shown in Table 3 is changed to change the effective refractive indices Ne1 and Ne3 in the first layer and the third layer, respectively.

The lower limit and the upper limit of numerical expression (2) are shown by the broken lines in FIG. 8. When the refractive indices N1 and N2 are the values shown in Table 3, the lower limit of the effective refractive index Ne1 in numerical expression (2) is 1.25(1×1.25) and the upper limit thereof is 2.409(3.3×0.73). As shown in FIG. 8, a complete photonic bandgap is exhibited over this range.

The upper limit and the lower limit of the effective refractive index Ne1 are determined for the same reason as in the first embodiment.

As described above, even when the refractive index of a medium constituting the photonic crystal is different from that above, this embodiment is effective.

Thus, the periodic-refractive-index structure in the first layer is determined so that the effective refractive index in the first layer is within the predetermined range, thereby realizing a three-dimensional photonic crystal that exhibits a photonic bandgap over a wide frequency range and that can be easily produced.

Third Embodiment

A three-dimensional photonic crystal according to a third embodiment of the present invention will now be described.

In the third embodiment, when the effective refractive index in the second layer 120 in the structure shown in FIGS. 1 to 3 is represented by Ne2, the radius R2 of the round holes constituting the periodic-refractive-index structure is changed. Thereby, the volume ratio f1 and the volume ratio f2 are changed. As a result, the effective refractive index Ne2 can be changed.

The shape of the periodic-refractive-index structure formed inside the fourth layer 140 is the same as that of the second layer 120. Therefore, the effective refractive index Ne4 in the fourth layer 140 is the same as the effective refractive index Ne2 in the second layer 120.

Figure 9:
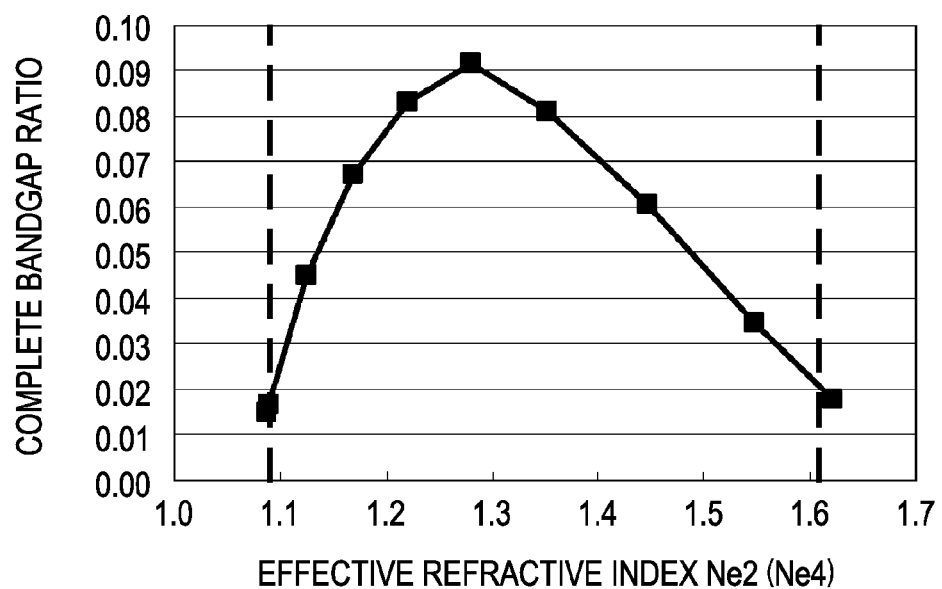
FIG. 9 is a graph showing the relationship between the effective refractive index Ne2 and the complete photonic bandgap ratio of a three-dimensional photonic crystal according to a third embodiment of the present invention.

FIG. 9 shows the change in the complete photonic bandgap ratio in the case where the radius R2 of the round holes in the structure shown in Table 1 is changed to change the effective refractive indices Ne2 and Ne4 in the second layer 120 and the fourth layer 140, respectively. In FIG. 9, the abscissa represents the effective refractive index Ne2 (Ne4), and the ordinate represents the complete photonic bandgap ratio. As shown in FIG. 9, in order to exhibit a complete photonic bandgap, the effective refractive index Ne2 (Ne4) must be in the range satisfying numerical expression (4).

The lower limit and the upper limit of numerical expression (4) are shown by the broken lines in FIG. 9. When the refractive indices N1 and N2 are the values shown in Table 1, the lower limit is 1.09(1×1.09) and the upper limit is 1.608(2.4×0.67). The effective refractive index Ne2 in the second layer 120 of the structure shown in Table 1 is 1.28, which satisfies numerical expression (4). In addition, the effective refractive index Ne2 of the structure shown in Table 2, in which the columnar structures in the second layer 120 has a different shape, is 1.35, which satisfies numerical expression (4).

$$1.09 \times N2 \leq Ne2 \leq 0.67 \times N1 \quad (4)$$

The upper limit and the lower limit of numerical expression (4) are determined for the same reason as in the case of the effective refractive index Ne1 in the first layer 110.

In particular, the value of the effective refractive index Ne2 (Ne4) significantly affects electromagnetic waves having a polarizing direction in the z-axis direction in which the medium having a high refractive index in the second layer 120 and the fourth layer 140 forms a connection and electromagnetic waves having a polarizing direction in the y-z diagonal direction or the x-z diagonal direction.

In order to obtain a wider complete photonic bandgap width, the effective refractive index Ne2 (Ne4) in the second layer 120 (in the fourth layer 140) satisfies the following numerical expression (4a):

$$1.1 \times N2 \leq Ne2 \leq 0.6 \times N1 \quad (4a)$$

As described above, according to this embodiment, in a photonic crystal formed by stacking layers having a periodic-refractive-index structure, the periodic-refractive-index structure in the second layer 120 (in the fourth layer 140) is determined so that the effective refractive index Ne2 (Ne4) in the second layer 120 (in the fourth layer 140) is within the predetermined range.

Thereby, a photonic bandgap can be exhibited over a wide frequency range. Furthermore, according to the photonic crystal of this embodiment, since the number of layers constituting one period is small, a three-dimensional photonic crystal that is easily produced can be realized.

Fourth Embodiment

A three-dimensional photonic crystal according to a fourth embodiment of the present invention will be described.

Figure 10:
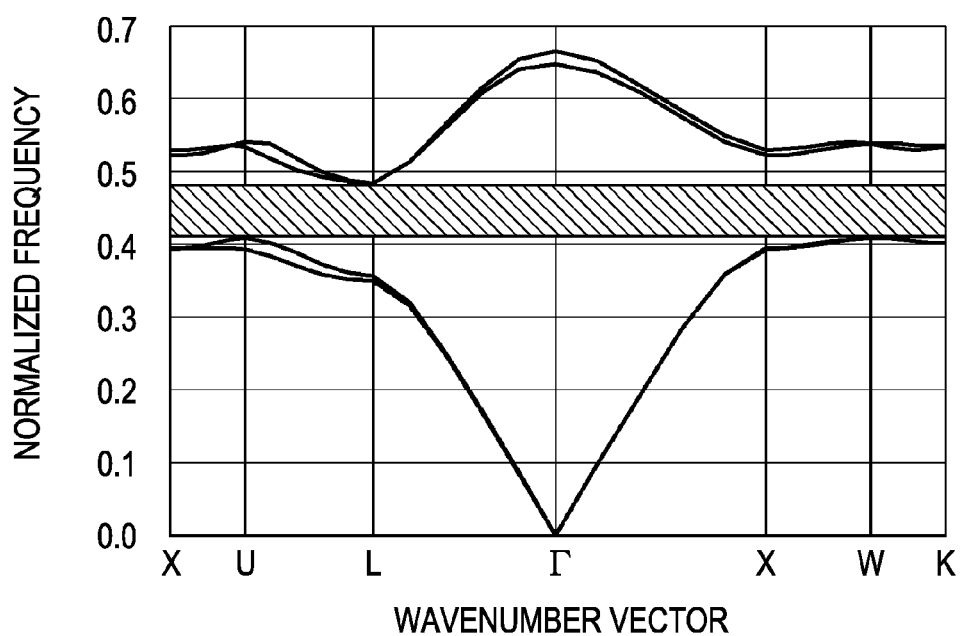
FIG. 10 is a schematic diagram of a photonic band structure of a three-dimensional photonic crystal according to a fourth embodiment of the present invention.

In the fourth embodiment the refractive index N1 of the first medium is different from that in the third embodiment. Table 4 shows the detailed structural parameters of the three-dimensional photonic crystal of the fourth embodiment. FIG. 10 shows a photonic band structure of the three-dimensional photonic crystal shown in Table 4 calculated by the plane-wave expansion method.

The complete photonic bandgap ratio $\Delta\omega/\omega_0$ in this structure is 0.151. In this case, the effective refractive index Ne2 in the second layer is 1.28, which satisfies numerical expression (4).

TABLE 4

| | |
|---|---|
| Refractive index N1 | 2.8 |
| Refractive index N2 | 1.0 |
| Period A | p |
| Period B | $\sqrt{2} \times p$ |
| Period C | p |
| Radius R1 of round hole | 0.44 × p |
| Radius R2 of round hole | 0.36 × p |
| Layer thickness H1 | 0.26 × p |
| Layer thickness H2 | 0.24 × p |

Figure 11:
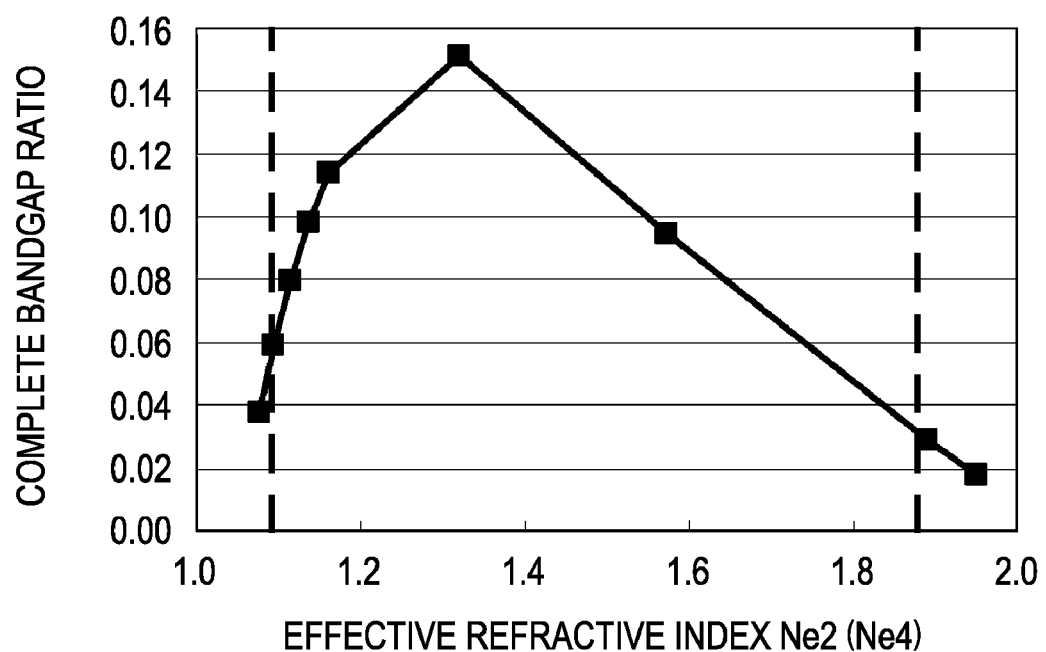
FIG. 11 is a graph showing the relationship between the effective refractive index Ne2 and the complete photonic bandgap ratio of the three-dimensional photonic crystal according to the fourth embodiment of the present invention.

FIG. 11 shows the change in the complete photonic bandgap ratio in the case where the radius R2 of the round hole in the structure shown in Table 4 is changed to change the effective refractive indices Ne2 and Ne4 in the second layer 120 and the fourth layer 140, respectively.

The lower limit and the upper limit of numerical expression (4) are shown by the broken lines in FIG. 11. When the refractive indices N1 and N2 are the values shown in Table 4, the lower limit of the effective refractive index Ne2 in numerical expression (4) is 1.09(1×1.09) and the upper limit thereof is 1.876(2.8×0.67). As shown in FIG. 11, a complete photonic bandgap is exhibited over this range.

The upper limit and the lower limit of the effective refractive index Ne2 (Ne4) are determined for the same reason as in the third embodiment.

As described above, even when the refractive index of a medium constituting the photonic crystal is different from that above, this embodiment is effective. Thus, the periodic-refractive-index structure in the second layer 120 is determined so that the effective refractive index Ne2 in the second layer 120 is within the predetermined range, thereby realizing a three-dimensional photonic crystal that exhibits a photonic bandgap over a wide frequency range and that can be easily produced.

In the above embodiments, the refractive index N2 of the second medium is 1.0, but is not limited to this.

As in known structures, at least two types of medium having a high refractive index ratio are used as the media forming these structures. For example, a compound semiconductor such as GaAs, InP, or GaN, a semiconductor such as Si, a dielectric material such as $TiO_2$, or a metal is used as the first medium having a high refractive index.

A dielectric material such as $SiO_2$, a polymeric material such as PMMA, air, or the like is used as the second medium having a low refractive index.

As described above, the photonic bandgap in a photonic crystal is obtained on the basis of a refractive index distribution in the crystal. Therefore, a combination of media that provide a larger refractive index ratio can provide a wider complete photonic bandgap. In order to obtain a complete photonic bandgap having an effective width, the refractive index ratio is 2 or more.

Fifth Embodiment

Figure 12:
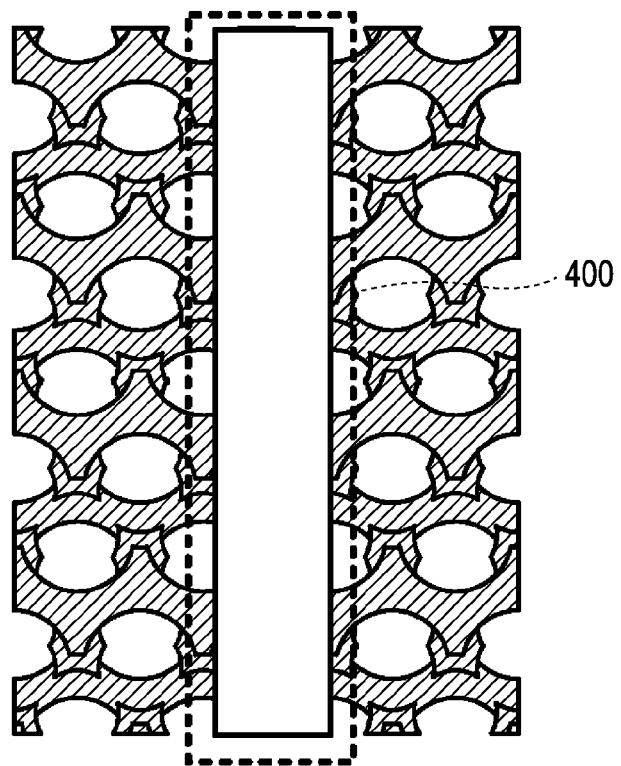
FIG. 12 is a view illustrating a functional device according to a fifth embodiment of the present invention.

Functional devices including the three-dimensional photonic crystal of the present invention will now be described in a fifth embodiment. FIG. 12 is a cross-sectional view of a functional device in which a waveguide 400 is composed of (or defined by) a linear defect that causes disorder in the periodic photonic crystal of the present invention.

In this embodiment, by providing the linear defect, electromagnetic waves that are in a part of the frequency range in the photonic bandgap produced by the periodic structure can be present only in the defect. Thereby, a waveguide that has a low loss and that can realize a steep angle of bend is provided.

The linear defect shown in FIG. 12 is formed by, for example, adding or removing elements of the structure, or shifting the position of the structure so as to form a waveguide having a desired performance such as a certain waveguide frequency range.

Consequently, since the base photonic crystal has a wide photonic bandgap, a waveguide that operates over a wide wavelength range can be realized, compared with the case where a known structure is used.

Figure 13:
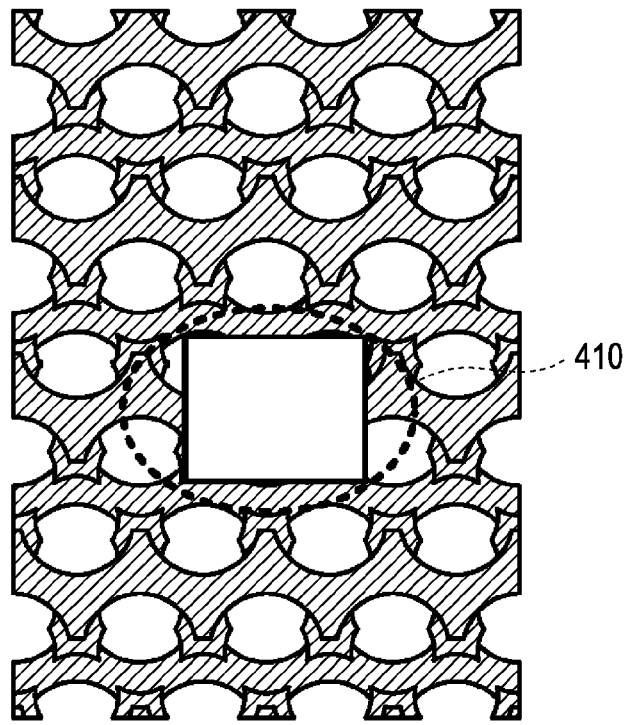
FIG. 13 is a view illustrating another functional device according to the fifth embodiment of the present invention.

FIG. 13 is a cross-sectional view of a resonator 410 prepared by forming an isolated point defect that causes disorder in the periodic three-dimensional photonic crystal of the present invention.

In this embodiment, shown in FIG. 13, by providing the point defect, electromagnetic waves that are in a part of the frequency range in the photonic bandgap produced by the periodic structure can be present only in the defect. Thereby, a high-performance resonator in which the electromagnetic waves are confined in a very small area and which have a high confinement effect is provided.

The use of this resonator can realize, for example, a wavelength selection filter that selects, from incident electromagnetic waves, waves having a very narrow wavelength range corresponding to the resonant wavelength of the resonator. The point defect is formed by, for example, adding or removing elements of the structure, or shifting the position of the structure so as to form a resonator having a desired performance such as a certain wavelength to be selected.

Consequently, since the base photonic crystal has a wide photonic bandgap, a resonator that operates over a wide wavelength range can be realized, compared with the case where a known structure is used.

In this embodiment, the resonator shown in FIG. 13 is filled with an active medium such as for example a luminescent material, and energy is supplied from the outside of the resonator by electromagnetic waves or a current. Thus, light-emitting devices, for example, a laser and an LED that have a markedly high efficiency can be realized.

Examples of the active medium that can be used include various materials such as compound semiconductors, inorganic luminescent materials, organic luminescent materials, polymer luminescent materials, quantum dots, and nanocrystals.

For example, when the resonant wavelength of the resonator is adjusted to the infrared optical communication wavelength range (wavelengths in the range of 800 to 1,800 nm), the resonator can be used as a light source for optical communication. Thus, when the resonant wavelengths are adjusted to the three primary colors of light, i.e., red (R), green (G), and blue (B), the resonator can be used as a light source for an image display apparatus. The resonator can also be used as a light source for pickup of optical discs such as CDs and DVDs.

By combining various functional devices such as the waveguide shown in FIG. 12, the resonator shown in FIG. 13, a light-emitting device, and a deflection device using an anomalous dispersion in the photonic band, a ultra-compact highly functional integrated circuit can be realized.

As described above, by constituting a functional device using the three-dimensional photonic crystal of the present invention, a functional device that operates over a wider wavelength range can be realized.

Sixth Embodiment

FIGS. 14A to 14I are cross-sectional views showing a method of producing a photonic crystal according to a sixth embodiment.

Figure 14A:
FIGS. 14A to 14I are cross-sectional views showing a method of producing a three-dimensional photonic crystal of the present invention.

First, a thin film 1002 composed of a medium 1 is formed on a substrate 1001 by crystal growth, evaporation, or the like (FIG. 14A).

Figure 14B:

A resist 1003 is then applied to the thin film 1002 (FIG. 14B).

Figure 14C:
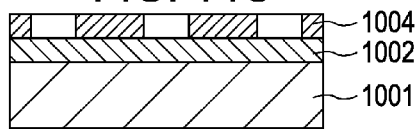

Subsequently, a periodic resist pattern 1004 is formed by electron beam lithography or the like (FIG. 14C). Holes are then formed in the thin film 1002 by etching using the periodic resist pattern 1004 as a mask.

Figure 14D:

The remaining resist 1003 is then removed to form a periodic-refractive-index structure 1005 in a first layer (FIG. 14D).

Figure 14E:

Next, a thin film 1007 composed of the medium 1 is formed on another substrate 1006 by crystal growth, evaporation, or the like (FIG. 14E).

Figure 14F:
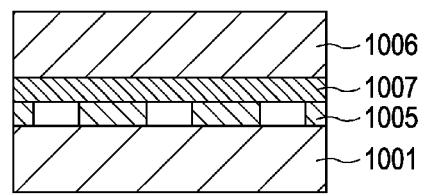
Figure 14G:
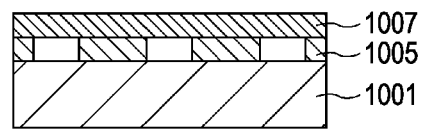

Subsequently, the substrates 1001 and 1006 are fusion-bonded so that the pattern surface of the periodic-refractive-index structure 1005 and the thin film 1007 face each other (FIG. 14F). The substrate 1006 is then removed by lift-off, etching, or the like (FIG. 14G).

The thin film 1007 is formed on the periodic-refractive-index structure 1005 by the above steps.

In another method of forming the thin film on the periodic-refractive-index structure, the spaces of the periodic-refractive-index structure 1005 may be filled with a medium 2 or a medium that can be selectively etched in a subsequent step, and the thin film may then be formed by crystal growth or evaporation on the periodic-refractive-index structure 1005.

Figure 14H:
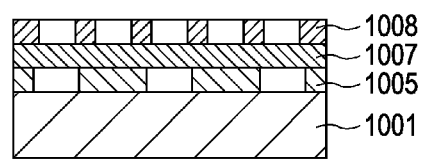
Figure 14I:
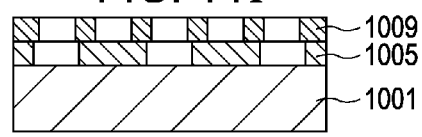

Subsequently, a resist is applied to the thin film 1007, and a periodic resist pattern 1008 is formed by electron beam lithography or the like (FIG. 14H). Subsequently, the thin film 1007 is etched using the periodic resist pattern 1008 as a mask, and the remaining resist is then removed. Thus, a periodic-refractive-index structure 1009 is formed in a second layer on top of the first layer (FIG. 14I).

The above-described production steps are repeated to form a third layer and the subsequent layers, thereby producing the three-dimensional photonic crystal composed of a plurality of layers of the present invention.

Figure 15:
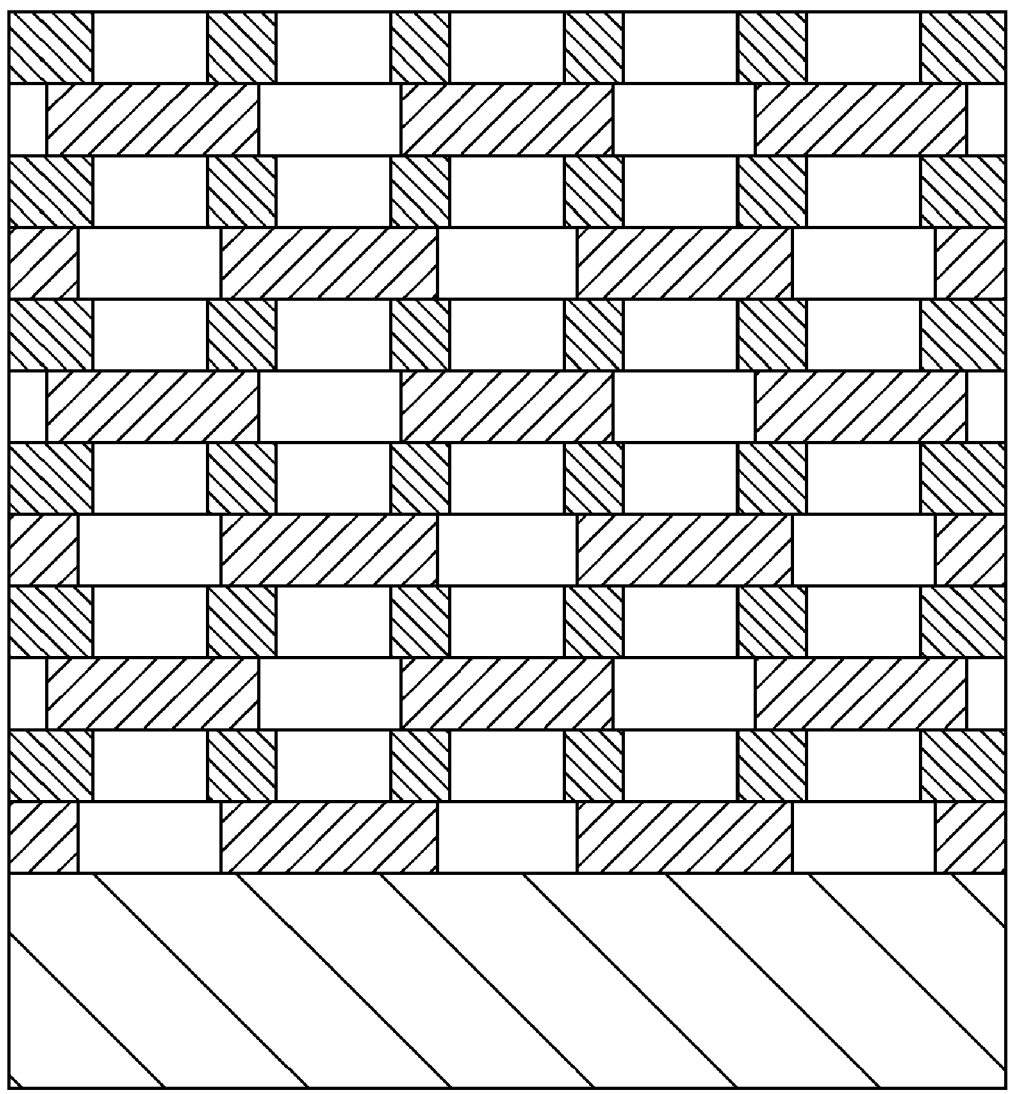
FIG. 15 is a view illustrating the three-dimensional photonic crystal of the present invention.

FIG. 15 is a cross-sectional view of the relevant part of a three-dimensional photonic crystal produced in the method of the sixth embodiment.

The periodic-refractive-index structure in the layers may be formed by combining etching with an interference exposure method, a nanoimprint method, a method of using multiphoton absorption by ultrashort pulse light, a method using lithography, for example, X-ray exposure, ultraviolet rays exposure, or nearfield exposure.

Seventh Embodiment

Next, a description will be made of a method of producing a three-dimensional photonic crystal of the present invention in the case where the holes disposed in each layer have the same shape in the layer planes, and in particular, the holes have the same area (for example R1=R2).

Figure 16A:
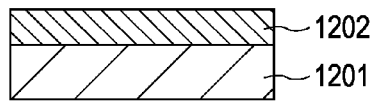
FIGS. 16A to 16K are cross-sectional views showing a method of producing a three-dimensional photonic crystal of the present invention.

As shown in FIG. 16A, a thin film 1202 composed of a medium 1 is formed on a substrate 1201 by crystal growth chemical or physical vapor deposition, evaporation, or some other way.

Figure 16B:
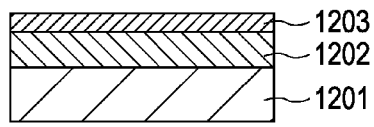
Figure 16C:
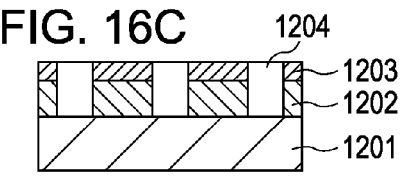
Figure 16D:
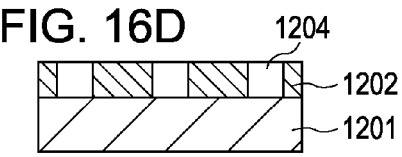

A resist 1203 is then applied to the thin film 1202 (FIG. 16B). Subsequently, a periodic resist pattern is formed by electron beam lithography or the like. Holes 1204 are then formed in the thin film 1202 by etching using the periodic resist pattern as a mask (FIG. 16C). The remaining resist 1203 is then removed to form a periodic-refractive-index structure in the thin film 1202 on the substrate (FIG. 16D).

Figure 16E:
Figure 16F:
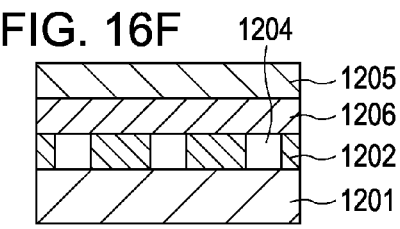
Figure 16G:
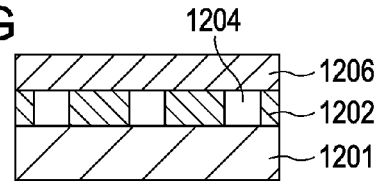

Next, as shown in FIG. 16E, a thin film 1206 composed of the medium 1 is formed on a substrate 1205. Subsequently, the substrates 1201 and 1205 are fusion-bonded so that the pattern surface of the periodic-refractive-index structure (first periodic-refractive-index structure) in the thin film 1202 and the thin film 1206 face each other (FIG. 16F). The substrate 1205 is then removed by lift-off, etching, or the like (FIG. 16G).

As another method of forming the thin film on the periodic-refractive-index structure, the following method may be used. Specifically, the spaces (holes 1204) of the periodic-refractive-index structure in the thin film 1202 may be filled with a medium 2 or a medium that can be selectively etched in a subsequent step. Subsequently, the thin film 1206 may then be formed by crystal growth or evaporation etc. on the periodic-refractive-index structure in the thin film 1202.

Subsequently, a resist 1207 is applied to the thin film 1206, and a periodic resist pattern is formed by electron beam lithography or the like. A periodic-refractive-index structure (second periodic-refractive-index structure) is then formed by etching the thin film 1206 using the periodic resist pattern as a mask. In this step, the etching is performed so that the depth of holes 1208 is deeper than the thickness of the thin film 1206 (FIG. 16H).

The remaining resist 1207 is then removed. Thus, a second layer and a third layer are formed on a first layer of the three-dimensional photonic crystal at the same time (FIG. 16I).

Next, a thin film 1209 composed of the medium 1 is formed on the thin film 1206 having the periodic-refractive-index structure (FIG. 16J) using the same step as the step of forming the thin film 1206 on the thin film 1202, which is shown in FIG. 16F.

Figure 16H:
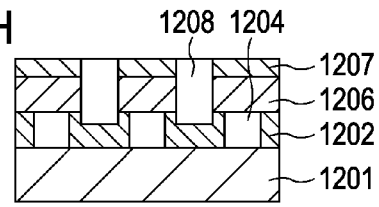
Figure 16I:
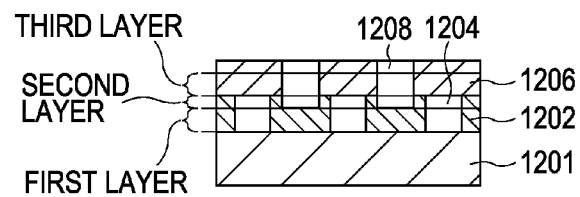
Figure 16J:
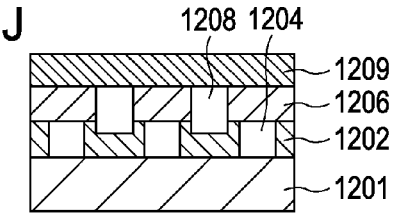

Next, holes 1210 are formed in the thin film 1209 using the same step as the step of forming the periodic-refractive-index structure in the thin film 1206, which is shown in FIG. 16H.

Figure 16K:
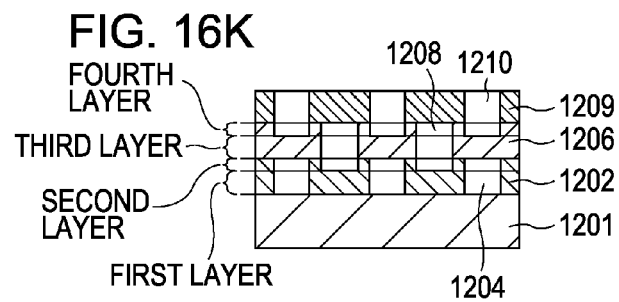

The first layer, the second layer, the third layer, and a fourth layer of the three-dimensional photonic crystal are formed by the above steps (FIG. 16K).

Figure 17:
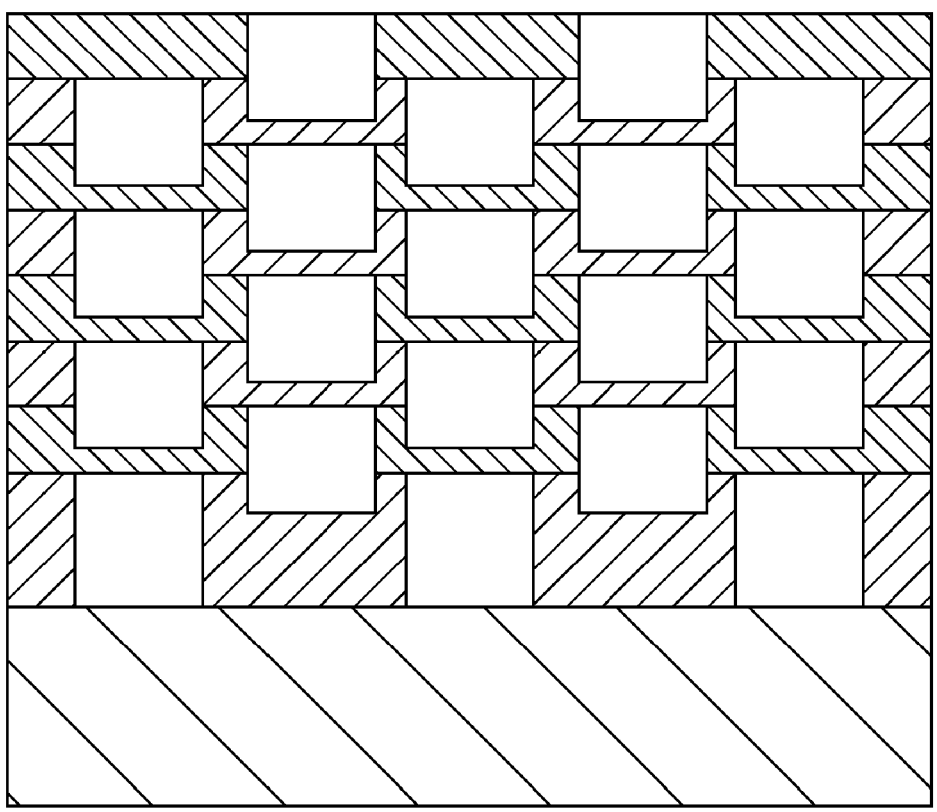
FIG. 17 is a view illustrating the three-dimensional photonic crystal of the present invention.
Figure 18A:
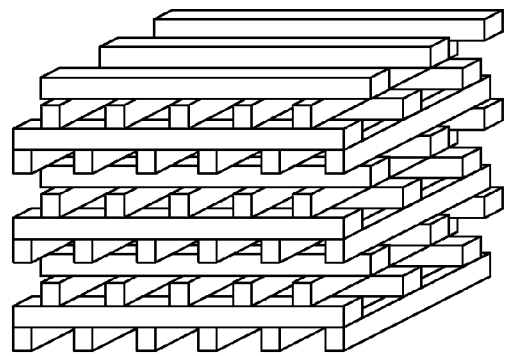
FIGS. 18A to 18C are views illustrating known three-dimensional photonic crystals.
Figure 18B:
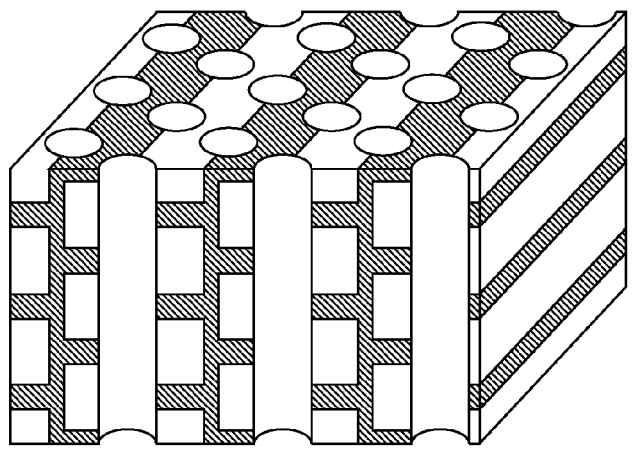
Figure 18C:
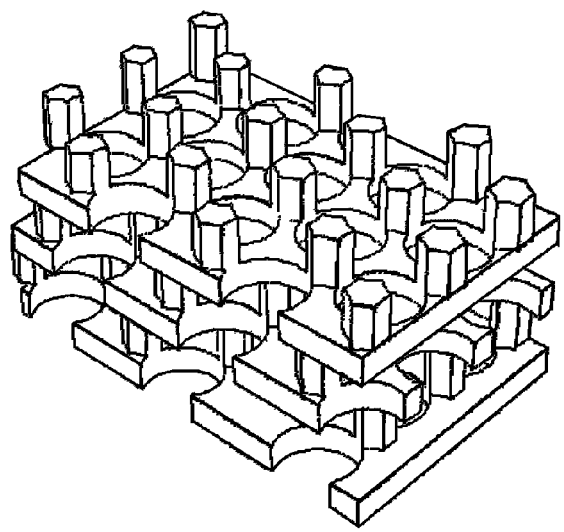

FIG. 17 is a cross-sectional view of the relevant part of the three-dimensional photonic crystal composed of a plurality of layers produced by repeating the above-described production method.

By employing the above production method, two adjacent layers in the three-dimensional photonic crystal of the present invention can be formed at the same time. Therefore, the three-dimensional photonic crystal can be produced more easily with a smaller number of steps.

As described above, according to the above embodiments, a complete photonic bandgap in which the wavelength range is wider than that of a known three-dimensional periodic structure can be obtained. When a functional device is produced using the three-dimensional periodic structure of one of the embodiments, a functional device that operates over a wider wavelength range can be realized. Furthermore, combinations of these functional devices can realize ultra-compact highly functional integrated circuits.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-311260 filed Oct. 26, 2005, which is hereby incorporated by reference herein in its entirety.

What is claimed is:

1. A three-dimensional photonic crystal in which a plurality of layers including a periodic-refractive-index structure are periodically stacked, comprising:

a first layer having a periodic structure in which holes filled with a second medium are provided at lattice points of a first rectangular lattice having a period of A along a first axis in the in-plane direction of the layers and a period of B along a second axis orthogonal to the first axis in the in-plane direction of the layers and at lattice points of a second rectangular lattice disposed at a position shifted by A/2 along the first axis and by B/4 along the second axis with respect to the position of the first rectangular lattice, and areas other than the holes are filled with a first medium;

a second layer having a periodic structure in which columnar structures that are composed of the first medium and that have a longitudinal axis in the stacking direction are provided at lattice points of a face-centered rectangular lattice that is disposed at a position shifted by +3B/8 along the second axis with respect to the position of the first rectangular lattice and that has a period of A along the first axis and a period of B along the second axis, and the area other than the columnar structures is filled with the second medium;

a third layer having a periodic structure the same as the periodic structure included in the first layer and disposed at a position shifted in the in-plane directions of the layer by A/2 along the first axis and by B/2 along the second axis with respect to the position of the periodic structure included in the first layer; and a fourth layer having a periodic structure the same as the periodic structure included in the second layer and disposed at the same position as the periodic structure included in the second layer in the in-plane directions of the layer, wherein the three-dimensional photonic crystal includes a plurality of layers including layers in which the first layer, the second layer, the third layer, and the fourth layer are stacked in that order, and when the refractive index of the first medium is represented by N1, the refractive index of the second medium is represented by N2, and the effective refractive index in the first layer and the third layer is represented by Ne1, the following relationship is satisfied:

$$1.25 \times N2 \leq Ne1 \leq 0.73 \times N1.$$

2. The three-dimensional photonic crystal according to claim 1, wherein the cross-sectional shape of the holes provided in the first layer and the third layer in the plane of the layer is a circle, an ellipse, or a polygon.

3. The three-dimensional photonic crystal according to claim 1, wherein when the effective refractive index in the second layer and the fourth layer is represented by Ne2, the following relationship is satisfied:

$$1.09 \times N2 \leq Ne2 \leq 0.67 \times N1.$$

4. The three-dimensional photonic crystal according to claim 1, wherein, in the second layer and the fourth layer, the columnar structures composed of the first medium are formed by a plurality of holes that are disposed at the same positions as the holes in the first layer and the holes in the third layer in the in-plane direction of the layers and that are filled with the second medium, and areas other than the plurality of holes.

5. The three-dimensional photonic crystal according to claim 4, wherein the cross-sectional shape of the plurality of holes provided in the second layer and the fourth layer in the plane of the layer is a circle.

6. The three-dimensional photonic crystal according to claim 4, wherein the shape of the holes of the first layer and the third layer is the same as the shape of the holes of the second layer and the fourth layer.

7. A functional device comprising the three-dimensional photonic crystal according to claim 1 and a defect provided inside of the three-dimensional photonic crystal.

8. The functional device according to claim 7, wherein the defect is a linear defect that causes disorder in the period, and the linear defect functions as a waveguide.

9. The functional device according to claim 7, wherein the defect is an isolated point defect that causes disorder in the period, and the point defect functions as a resonator.

10. A light-emitting device comprising the functional device according to claim 9 including an active medium that exhibits a luminescent effect in the resonator, and an excitation device that excites the active medium.

11. The light-emitting device according to claim 10, wherein the light-emitting device is a laser.

12. A method of producing a three-dimensional photonic crystal comprising a step of forming holes of adjacent layers at the same time to produce the three-dimensional photonic crystal according to claim 6.

13. A method of producing a three-dimensional photonic crystal comprising the steps of:

forming a layer having a first periodic-refractive-index structure on a substrate;

forming a thin film on the layer having the first periodic-refractive-index structure; and forming a second periodic-refractive-index structure in the thin film by etching the thin film so that the depth of holes formed by the etching is larger than the thickness of the thin film to produce the three-dimensional photonic crystal according to claim 1.

* * * * *